(12) United States Patent
Becoulet et al.

(10) Patent No.: US 12,228,074 B2
(45) Date of Patent: Feb. 18, 2025

(54) FAN MODULE PROVIDED WITH AN OIL TRANSFER DEVICE

(71) Applicant: SAFRAN AIRCRAFT ENGINES, Paris (FR)

(72) Inventors: Julien Fabien Patrick Becoulet, Moissy-Cramayel (FR); Olivier Belmonte, Moissy-Cramayel (FR); Vincent François Georges Millier, Moissy-Cramayel (FR); Jean Charles Olivier Roda, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/550,155

(22) PCT Filed: Mar. 3, 2022

(86) PCT No.: PCT/FR2022/050378
§ 371 (c)(1),
(2) Date: Sep. 12, 2023

(87) PCT Pub. No.: WO2022/195191
PCT Pub. Date: Sep. 22, 2022

(65) Prior Publication Data
US 2024/0159187 A1 May 16, 2024

(30) Foreign Application Priority Data
Mar. 16, 2021 (FR) ........................................ 2102620

(51) Int. Cl.
*F02C 7/06* (2006.01)
*F01D 7/00* (2006.01)
(Continued)

(52) U.S. Cl.
CPC .................. *F02C 7/06* (2013.01); *F01D 7/00* (2013.01); *F01D 25/16* (2013.01); *F16H 57/043* (2013.01);
(Continued)

(58) Field of Classification Search
CPC .............. F02C 7/06; F01D 7/00; F01D 25/16; F16H 57/043; F16H 57/04; F16H 57/0471;
(Continued)

(56) References Cited

U.S. PATENT DOCUMENTS 2,928,474 A * 3/1960 Haworth ................. B64C 11/42
416/157 R
3,489,470 A * 1/1970 Lunde ...................... B66D 3/04
384/473
(Continued)

FOREIGN PATENT DOCUMENTS

EP    3 070 377 A1    9/2016
EP    3 138 771 A1    3/2017
(Continued)

OTHER PUBLICATIONS

Sasa, Slavic, "Turbocharger Device with Open Spring Ring for Holding a Bearing Sleeve Machine Translation," DE 102017216282 A1, Mar. 14, 2019 (Year: 2019).*
(Continued)

*Primary Examiner* — Woody A Lee, Jr.
*Assistant Examiner* — Joshua R Beebe
(74) *Attorney, Agent, or Firm* — CHRISTENSEN O'CONNOR JOHNSON KINDNESS PLLC

(57) ABSTRACT

A fan module for an aircraft turbine engine includes a fan having variable pitch blades and an oil transfer device configured to provide a transfer of oil between a stator and a rotor. The oil transfer device includes a stator ring having internal oil ducts, a shaft inserted into the ring and having
(Continued)

internal oil ducts, and an annular support of the ring configured to deform elastically to allow movements of the ring in the radial direction. A plain bearing is located between the ring and the shaft, and roller bearings are mounted between the ring and the shaft on either side of the plain bearing.

21 Claims, 8 Drawing Sheets

(51) Int. Cl.
  *F01D 25/16* (2006.01)
  *F16H 57/04* (2010.01)
  *F16H 57/08* (2006.01)
(52) U.S. Cl.
  CPC ..... *F16H 57/0471* (2013.01); *F16H 57/0486* (2013.01); *F16H 57/082* (2013.01); *F05D 2220/36* (2013.01); *F05D 2230/60* (2013.01); *F05D 2240/50* (2013.01); *F05D 2260/40311* (2013.01); *F05D 2260/70* (2013.01)
(58) Field of Classification Search
  CPC ............... F16H 57/0486; F16H 57/082; F05D 2220/36; F05D 2230/06; F05D 2260/40311; F05D 2260/70
  See application file for complete search history.

(56) References Cited

U.S. PATENT DOCUMENTS

| | | | |
|---|---|---|---|
| 4,893,989 A * | 1/1990 | Carvalho | ............... B63H 3/082 |
| | | | 416/157 R |
| 8,484,942 B1 | 7/2013 | McCune et al. | |
| 10,724,445 B2 * | 7/2020 | Sheridan | ................... F02K 3/06 |
| 2004/0037483 A1 | 2/2004 | Beauvais et al. | |
| 2013/0084032 A1 * | 4/2013 | Heidari | ..................... F02C 7/06 |
| | | | 384/91 |
| 2016/0252134 A1 * | 9/2016 | Koda | ...................... F01D 25/16 |
| | | | 384/462 |
| 2017/0167507 A1 * | 6/2017 | Niergarth | .................. F02K 3/06 |
| 2018/0156114 A1 * | 6/2018 | Nonato de Paula | .. F04D 29/059 |

FOREIGN PATENT DOCUMENTS

| | | |
|---|---|---|
| EP | 3 179 044 A1 | 6/2017 |
| GB | 824332 A | 11/1959 |
| WO | 2015102779 A1 | 7/2015 |
| WO | 2020074816 A1 | 4/2020 |

OTHER PUBLICATIONS

International Search Report mailed Apr. 22, 2022, issued in corresponding International Application No. PCT/FR2022/050378, filed Mar. 3, 2022, 7 pages.

Written Opinion mailed Apr. 22, 2022, issued in corresponding International Application No. PCT/FR2022/050378, filed Mar. 3, 2022, 6 pages.

* cited by examiner

FAN MODULE PROVIDED WITH AN OIL TRANSFER DEVICE

FIELD OF THE DISCLOSURE

The disclosure relates to a fan module for an aircraft turbine engine, this module comprising an oil transfer device.

BACKGROUND

The technical background comprises the documents US-A1-2004/0037483, WO-A1-2020/074816, EP-A1-3 138 771, EP-A1-3 179 044, EP-A1-3 070 377, US-B1-8,484,942, and WO-A1-2015/102779.

An aircraft turbine engine typically comprises a gas generator comprising, from upstream to downstream in the flowing orientation of the operating gases, at least one compressor, an annular combustion chamber and at least one turbine.

The gases entering the gas generator are compressed in the compressor or the compressors, then mixed with fuel and burnt in the combustion chamber. The combustion gases flow and expand in the turbine or turbines to drive its rotor or rotors.

In the case of a turbine engine with double spool, one low-pressure and one high-pressure, the rotor of the high-pressure turbine is connected by a high-pressure shaft to the rotor of the high-pressure compressor, and the rotor of the low-pressure turbine is connected by a low-pressure shaft to the rotor of the low-pressure compressor.

The turbine engine can be equipped with one or more shrouded or non-shrouded propellers. In the case of a shrouded propeller located upstream of the gas generator, this propeller is referred to as fan and is driven by the low-pressure shaft of the gas generator. The fan generates a flow of gas during operation which is divided into a first flow, referred to as the primary flow, which flows into the gas generator as described above, and a second flow, referred to as the secondary flow, which flows around the gas generator.

The bypass ratio, which is the ratio of the secondary flow rate to the primary flow rate, is increasingly important in the modern turbine engine, resulting in an increase in the diameter of the fan and a reduction in the diameter of the gas generator.

To limit the speed of rotation of the fan, particularly in the turbine engines with a high bypass ratio, it is known to drive this fan by means of a reducer, generally of the epicyclic or planetary gear train type. The low-pressure shaft then drives the fan by means of the reducer.

A fan, or a propeller in general, may comprise variable pitch blades, i.e. each of the blades has an orientation about a radial axis that can be precisely adjusted. The blades are carried by a polygonal annulus-shaped hub and are displaced in rotation about these axes by means of a common hydraulic actuator mounted inside the hub. This actuator is supplied with oil and can be located in a rotating reference frame when it is secured in rotation to the hub and to the fan.

The turbine engine comprises a lubrication system comprising an oil reservoir and a pump, which is generally located in a stationary reference frame. It is therefore understood that the actuator must be supplied with oil from the lubrication system via an oil transfer device from a stationary reference frame to a rotating reference frame. A device of this type is commonly referred to as an OTB, an acronym for Oil Transfer Bearing.

This type of device can be mounted in a turbine engine with a fan of the type mentioned above to supply the actuator with oil and also to supply the reducer with lubricating oil. This type of device can also be mounted in another type of turbine engine, such as a turbine engine equipped with a non-shrouded propeller with variable pitch blades, of the turboprop type.

In the present technique, an oil transfer device comprises a stator annulus which comprises an internal cylindrical surface and internal oil pipes which each open onto this internal cylindrical surface. These pipes are connected by conduits to the above-mentioned lubrication system.

The device also comprises a shaft engaged in the annulus and movable in rotation about an axis inside this annulus. The shaft comprises an external cylindrical surface extending inside the internal cylindrical surface of the annulus, and internal oil pipes which each open onto this external cylindrical surface. These pipes are connected to the actuator by conduits to supply it with oil.

In the current technique, the external cylindrical surface of the shaft comprises annular grooves for housing annular sealing segments. These segments are able to displace in the grooves and are configured to rest radially on the internal surface of the annulus to limit and control oil leaks. The outlets of the above-mentioned pipes are located between two adjacent segments, thus ensuring that as much oil as possible from each pipe in the annulus is supplied to a corresponding pipe on the shaft. The number of segments is equal to twice the number of pipes. The document GB-A-824,332 describes an oil transfer device of this type.

However, this technology is unsatisfactory for a number of reasons. The manufacturing and assembly tolerances of the parts make it difficult to control these leaks precisely. The device comprises many parts, which makes the assembly more complex. The manufacture and the assembly of such a device is therefore relatively long and costly. In addition, the greater the number of pipes in the device and the greater the number of sealing segments, the greater the axial dimension and therefore the axial overall dimension of the device for mounting these different segments. An oil transfer device can be complex to integrate into a turbine engine because of its overall dimension. Finally, the service life of such a device is generally limited due to potential misalignments between the shaft and the annulus during operation and wear on the sealing segments, which can be accentuated by these misalignments as well as by the speed of rotation of the shaft. The larger the diameter of the device, the greater the peripheral speed of the shaft and the greater the wear on the segments.

Another particularity of the devices of the current technology is that each device is generally in the form of a cartridge which is mounted as a single bloc in the turbine engine. In the present application, the term "cartridge" refers to the assembly formed by the shaft and the annulus of a device, which are pre-mounted one inside the other before mounting this assembly in a turbine engine.

If the transfer device were located downstream of the reducer of the turbine engine, the access to the device and the cartridge from upstream would not be possible during a maintenance operation. The attachment of the annulus of the device to a stator of the turbine engine, as well as dismounting the annulus from this stator, should be done from downstream of the turbine engine and the lubrication enclosure in which the reducer is located. This would mean having to dismount the low-pressure compressor of the turbine engine and the equipment mounted in this area, which would be time-consuming and tedious.

The disclosure thus proposes an improved oil transfer device which solves all or some of the problems of the prior technique.

SUMMARY

The disclosure relates to a fan module for an aircraft turbine engine, this module comprising a fan which comprises a fan shaft and variable pitch fan vanes, and an oil transfer device which is configured to ensure a transfer of oil between a stator and an actuator which is secured in rotation to the fan shaft and which is configured to control the pitch of the fan vanes, this device comprising:
- a stator annulus comprising an internal cylindrical surface and internal oil pipes each opening onto the internal cylindrical surface,
- a shaft engaged in the annulus and comprising an external cylindrical surface extending inside the internal cylindrical surface, the shaft comprising internal oil pipes each opening onto the external cylindrical surface, the shaft further comprising an attachment member configured to be attached to a rotor of the turbine engine, and
- an annular support which extends at least partly around the annulus and which comprises at least one first attachment member for attaching to the annulus and at least one second attachment member configured to be attached to a stator of the turbine engine, characterised in that it further comprises:
- a plain bearing located between the internal and external cylindrical surfaces, and
- roller bearings mounted between the annulus and the shaft, on either side of the plain bearing, each of these bearings comprising external rings and rollers carried by the annulus, the annulus being configured to be mounted on the shaft by engagement of the shaft in the annulus when the latter is pre-equipped with the external rings and with the rollers of the bearings, and in that the support is configured to deform elastically so as to allow the annulus to displace in the radial direction.

The disclosure thus proposes an oil transfer device with no sealing members or segments between the cylindrical surfaces facing the stator annulus and the shaft. Instead, a plain bearing is provided between these surfaces. Rolling bearings are mounted on either side of this plain bearing so as to guarantee the radial thickness of the plain bearing, whatever the speed of the turbine engine and the peripheral speed of the shaft of the transfer device. The rolling bearings are automatically lubricated by the oil that leaks from the plain bearing during operation. The rolling bearings also ensure the limitation of the oil leakage outside the plain bearing and the device. The rolling bearings also allow to eliminate the risk of misalignment between the annulus and the shaft, and therefore the risk of contact between them and wear. The sealing segments are therefore no longer wear parts of the device, which therefore has an optimised service life compared with prior technology.

According to the disclosure, the device is not in the form of a cartridge when mounted. Instead, the annulus of the device can be attached initially to the stator of the turbine engine, by means of the support. Independently of this, the shaft of the device can be attached to a rotor of the turbine engine, for example to the rotating planet carrier of an epicyclic reducer. The shaft is then rigidly attached to the planet carrier and is secured in rotation to it. The annulus is connected to the stator by the support, which is flexible in a radial direction. This flexibility is useful and important for two reasons. Firstly, when the shaft is mounted and inserted into the annulus, the annulus is able to displace radially and self-centring on the shaft. In operation, the support also allows relative displacements in the radial direction between the device and the stator of the turbine engine. This allows to limit the constraints in the device and the risk of misalignment between the shaft and the annulus of the device, thus guaranteeing a plain bearing of constant radial thickness inside the device.

The module according to the disclosure may comprise one or more of the following characteristics, taken alone or in combination with each other:
- the support comprises at least one first perforated frustoconical wall;
- the first frustoconical wall has its internal periphery connected to or carrying the first member, this first wall extending for example radially inwards from upstream to downstream;
- the support comprises a second frustoconical wall, the internal periphery of which is connected to the external periphery of the first wall and the external periphery of which is connected to or carries the second member, this second wall extending, for example, radially outwards from upstream to downstream;
- the first wall has its external periphery connected to the external periphery of a third frustoconical wall, the internal periphery of which is connected to or carries an external ring of another roller bearing, this third wall extending for example radially outwards from upstream to downstream.
- the device comprises openings for the passage or the connection of conduits supplying oil to the pipes of the annulus;
- a shrink ring is mounted inside the annulus and defines the plain bearing with the external surface of the shaft;
- the shaft comprises integrated internal raceways for rolling the rollers;
- the internal raceways are formed by a single cylindrical surface which extends continuously inside the shrink ring;
- the rings of the bearings have identical internal diameters;
- the shrink ring has two cylindrical surfaces extending around each other, including a cylindrical shrink-fit surface on the annulus and a cylindrical centring surface on the shaft,
- the shrink ring comprises orifices which are located opposite the outlets of the pipes of the annulus, and which cover, for example, annular grooves formed at the level of these outlets and/or the outlets of the pipes of the shaft,
- the fan is driven in rotation by a reducer, the device being mounted upstream of the reducer and being configured to supply oil to the reducer and to the actuator via conduits passing axially through the reducer, and in particular a planet carrier of the reducer;
- the shaft of the device is attached to the planet carrier of the reducer;
- a rolling bearing, in particular a roller bearing, is mounted between the planet carrier and the support;
- the reducer is of the epicyclic type, i.e. with a planet carrier that can move in rotation and therefore with a ring gear that cannot rotate,
- the device supplies lubricating oil to the reducer, and in particular to at least some of its bearings and toothing,
- the device is configured to supply the actuator with an oil pressure of between 2 and 200 bar, and preferably between 5 and 130 bar, the device is configured to supply the reducer with an oil pressure of between 2 and 50 bar, and preferably between 5 and 20 bar.

The present disclosure also relates to a method for assembling a turbine engine as described above, comprising the steps of:
attaching the shaft to the planet carrier of the reducer, and attaching the annulus to the stator by means of the support, then
engaging the shaft in the annulus.

The method according to the disclosure may comprise one or more of the following steps, taken alone or in combination with each other:
the shaft of the device is engaged in an annular space formed between the annulus, on the one hand, and a drive shaft of the sun gear of the reducer, on the other hand,
the shaft of the device comprises a single, continuous cylindrical surface for forming plain and roller bearings with the annulus,
during the engagement, rollers carried by the planet carrier of the reducer are engaged in an external ring carried by the support, in order to form a rolling bearing for guiding the planet carrier.

The disclosure also relates to an aircraft turbine engine, comprising a module as described above.

DESCRIPTION OF THE DRAWINGS

Further characteristics and advantages will be apparent from the following description of a non-limiting embodiment of the disclosure with reference to the appended drawings in which.

DETAILED DESCRIPTION

Figure 1:
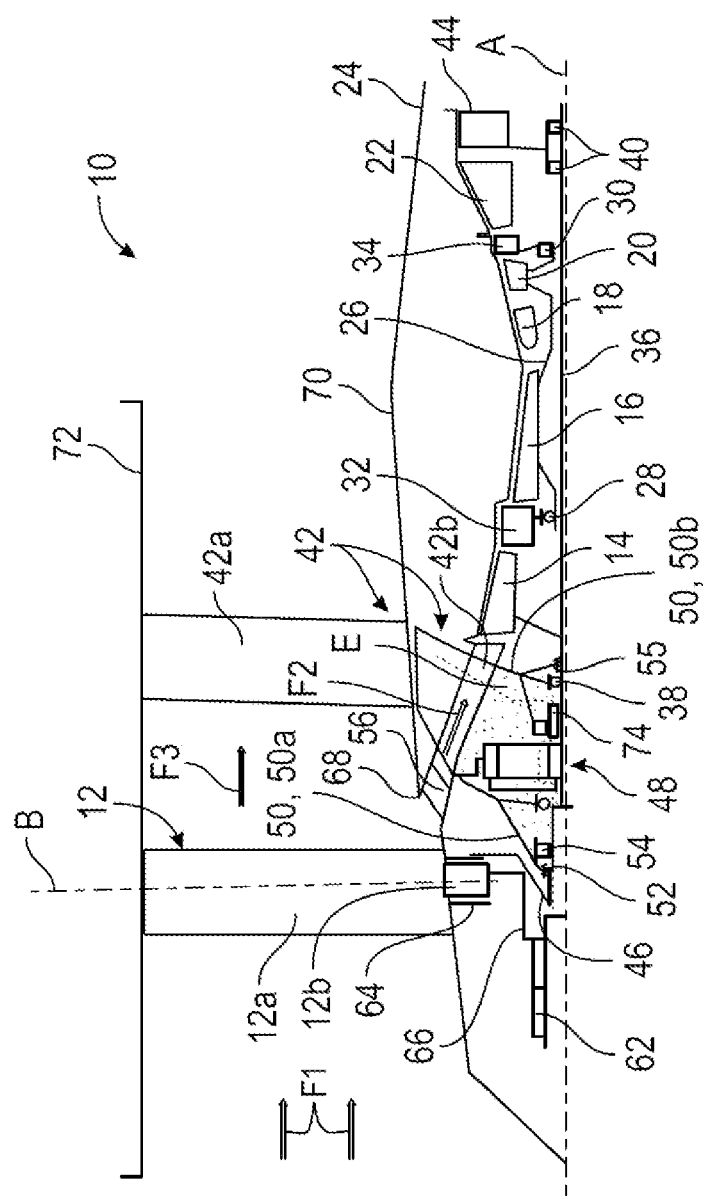
FIG. 1 is a schematic half-view in axial cross-section of a turbine engine equipped with an oil transfer device.

FIG. 1 shows a turbine engine 10 which typically comprises a fan 12, a low-pressure (LP) compressor 14, a high-pressure (HP) compressor 16, an annular combustion chamber 18, a high-pressure (HP) turbine 20, a low-pressure (LP) turbine 22 and an exhaust nozzle 24.

The rotors of the high-pressure compressor 16 and of the high-pressure turbine 20 are connected by a high-pressure shaft 26 and together form a high-pressure (HP) spool, which is guided in rotation about the longitudinal axis A of the turbine engine by rolling bearings 28, 30. A first bearing 28 is mounted between an upstream end of the shaft 26 and of the HP spool and an inter-compressor casing 32 located between the compressors LP 14 and HP 16. A second bearing 30 is mounted between a downstream end of the shaft 26 and the HP spool and an inter-turbine casing 34 located between the LP 22 and HP 24 turbines.

The rotors of the LP compressor 14 and of the LP turbine 22 are connected by a low-pressure shaft 36 and together form a low-pressure (LP) spool which is guided in rotation about the longitudinal axis A of the turbine engine by rolling bearings (38, 40). At least one bearing 38 is mounted between an upstream end of the shaft 36 and of the LP spool and an inlet casing 42 located upstream of the LP compressor 14. Other bearings 40 are mounted between a downstream end of the shaft 36 and of the LP spool and an exhaust casing 44 located downstream of the LP turbine 22.

The fan 12 is driven by a fan shaft 46 which is driven by the LP shaft 36 by means of a reducer 48. This reducer 48 is generally of the planetary or epicyclic type.

The following description relates to a reducer of the epicyclic type, in which the planet carrier and the sun gear are rotatable, the ring gear of the reducer being stationary in the reference frame of the engine.

The reducer 48 is positioned in the upstream portion of the turbine engine. A stationary structure comprising schematically, here, an upstream portion 50a and a downstream portion 50b which makes up the motor casing or stator 50 is arranged so as to form an enclosure E surrounding the reducer 48. This enclosure E is closed upstream by a sealing 52 at the level of a bearing 54 through which the fan shaft 46 passes, and downstream by a sealing 55 at the level of a bearing 38 through which the LP shaft 36 passes.

The enclosure E is arranged inside the inlet casing 42, which is located between an inlet rectifier blading 56 and the LP compressor 14.

Figure 2:
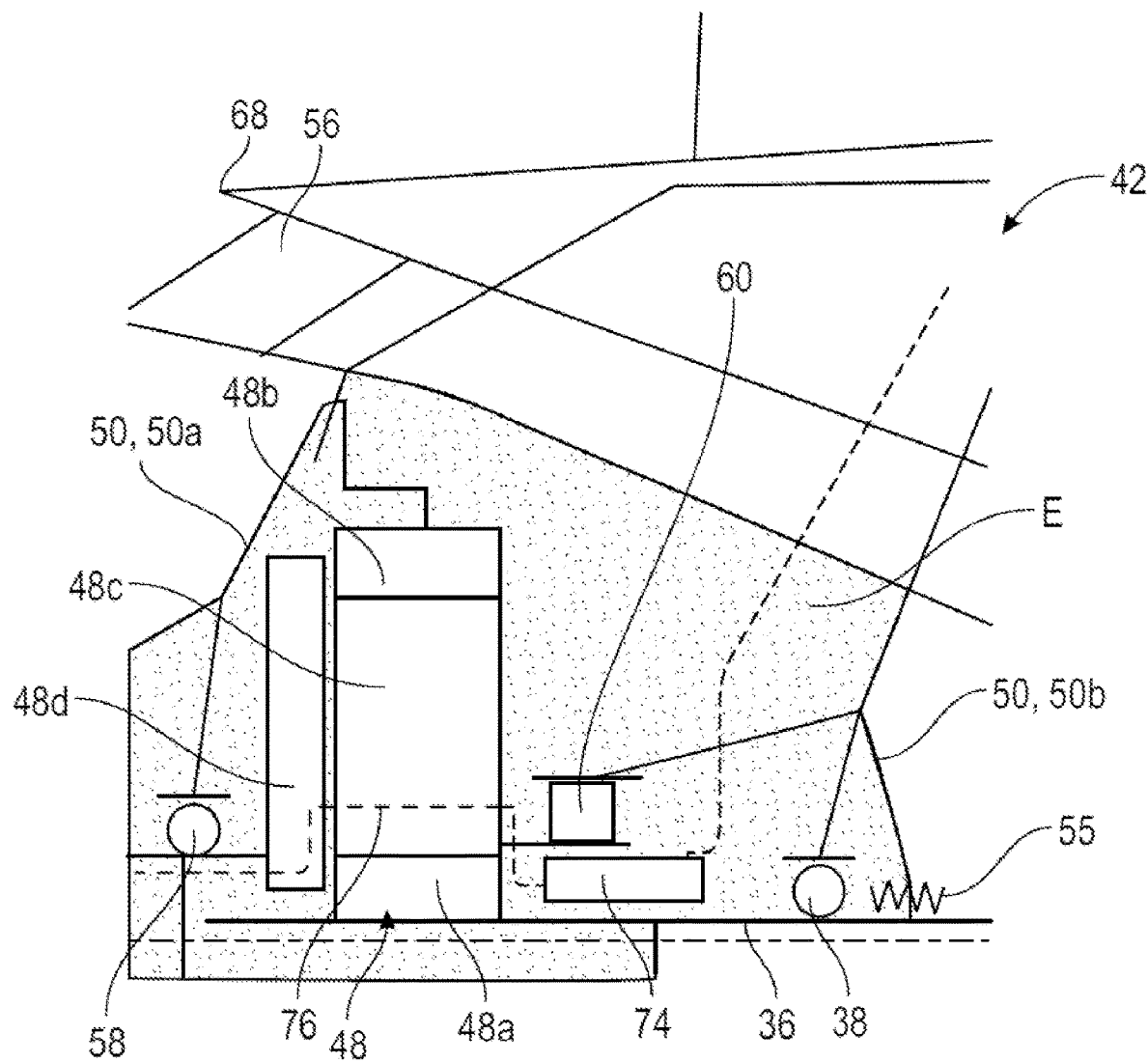
FIG. 2 is a larger scale view of a portion of FIG. 1.

FIG. 2 shows the reducer 48 on a larger scale.

The reducer 48 comprises a sun gear 48a centred on the axis A and coupled to the LP shaft 36 by means of splines, for example.

The reducer 48 comprises a ring gear 48b which is also centred on the axis A and attached to the inlet casing 42.

Finally, the reducer 48 comprises planet gears 48c arranged around the axis A and meshing with the sun gear 48a and the ring gear 48b. These planet gears 48c are carried by a planet carrier 48d which is movable in rotation about the axis A and is connected to the fan shaft 46 to drive it in rotation. The planet carrier 48d is guided by bearings 58, 60 carried by the inlet casing 42, these bearings 58, 60 being located respectively upstream and downstream of the reducer 48.

The fan 12 shown in FIG. 1 comprises variable pitch blades 12a and is associated with an actuator 62 which allows to control in a centralised manner the positioning of the blades 12a about their axes B, which are generally radial axes relative to the axis A of the turbine engine.

Each of the blades 12a comprises a root 12b forming a pivot which is housed in a housing of a hub 64 in the form of a polygonal annulus, and which is connected by a connection system 66 connecting to a piston of the actuator 62.

The actuator 62 extends along the axis A and its piston is translationally movable along this axis, for example from a first position in which the blades 12a are feathered to a second position in which the blades 12a obstruct the passage of air through the fan 12.

The airflow F1 which passes through the fan 12 is divided into two annular and coaxial flows downstream of the fan by an annular separator 68 which extends around the blading 56. A first air flow, referred to as the primary flow F2, flows in a primary duct passes through this blading 56 and flows into the compressors 14 and 16 to be compressed. This compressed air is then mixed with fuel and burnt in the combustion chamber 18. The combustion gases are then expanded in the turbines 20, 22 to drive their rotors and the LP 36 and HP 26 shafts, then flow into the nozzle 24.

A second air flow, referred to as the secondary flow F3, flows in a secondary duct which is defined internally by an annular engine casing 70 which extends longitudinally around the compressors 14, 16, the combustion chamber 18 and the turbines 20, 22, and outwardly by an annular nacelle casing 72 which extends longitudinally around the fan 12 and a portion of the engine. This nacelle casing 72 is connected to the engine by outlet guide vanes 42a of the inlet casing 42. These guide vanes 42a are structural and are configured to straighten the flow of air leaving the fan 12.

The actuator 62 is hydraulic and operates with a fluid, oil, which comes from a lubrication system located generally in the nacelle or between the compressors 14, 16 and the casing 70 (i.e. in the engine) and therefore in a stationary reference frame of the turbine engine. In contrast, the actuator 62 is located in a rotating reference frame.

As can be seen in FIG. 2, the turbine engine 10 comprises a device 74 for transferring oil from the stationary reference frame of the engine to the rotating frame in which the actuator 62 is located.

In the example shown, the device 74 is located downstream of the reducer 48 and preferably comprises several oil supply ways 76 to supply the actuator 62 and also to lubricate the reducer 48.

The dotted line in FIG. 2 symbolises one of these ways along its entire path, from the stationary reference frame to the actuator 62: through the primary duct to the device 74, through the reducer 48 (between its planet gears or through the axles of these planet gears), and along the planet carrier and then the fan shaft 46.

Figure 3:
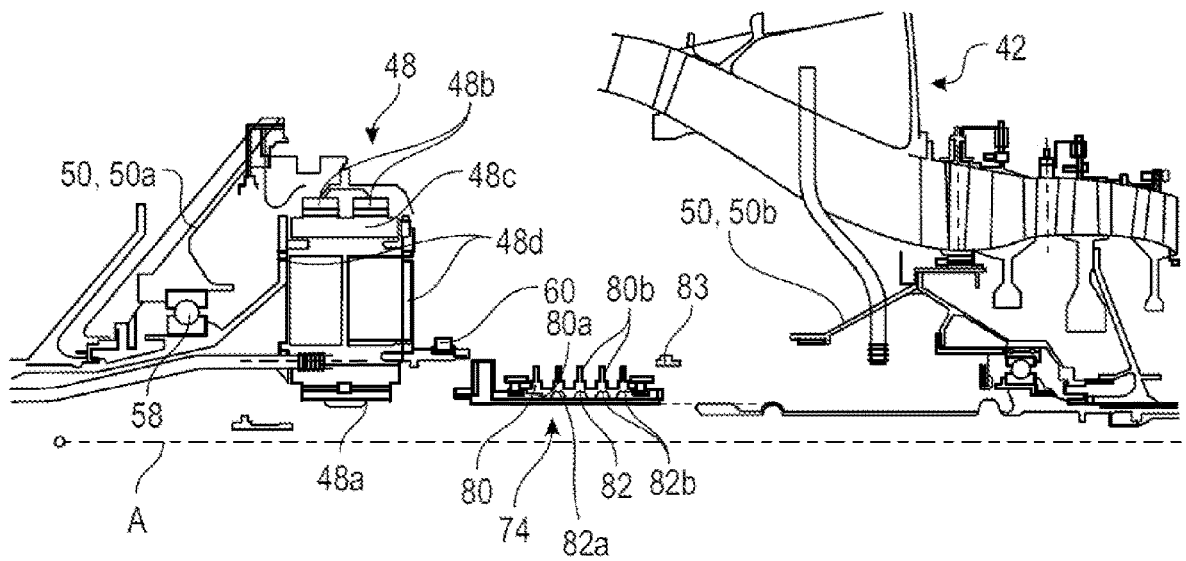
FIG. 3 is a schematic half-view in axial cross-section of a turbine engine equipped with an oil transfer device, and illustrates a step in the assembly of this device.
Figure 4:
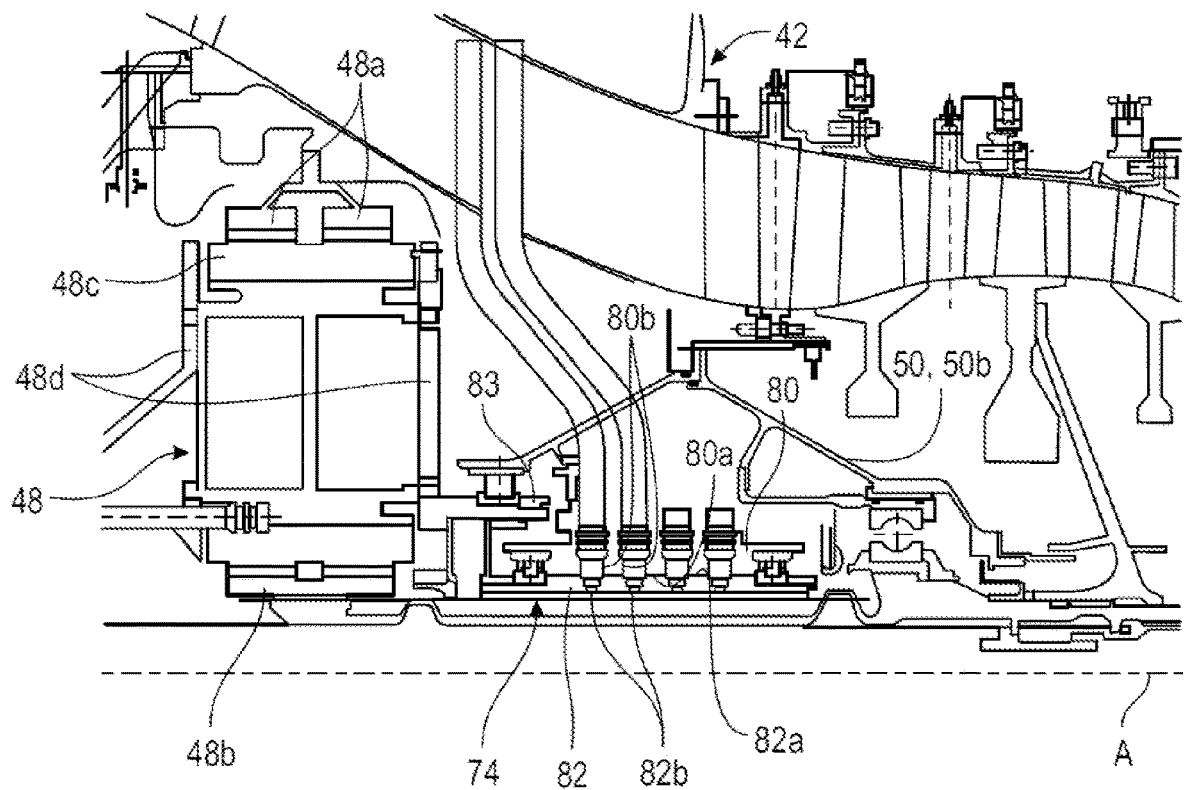
FIG. 4 is a schematic half-view in axial cross-section of the turbine engine in FIG. 3 after assembly of the device.

FIGS. 3 and 4 illustrate in more detail an oil transfer device 74 which comprises:
- a stator annulus 80 comprising an internal cylindrical surface 80a and internal oil pipes 80b each opening onto the internal cylindrical surface 80a, and
- a shaft 82 engaged in the stator annulus 80 and movable in rotation about the axis A inside this annulus 80, the shaft 82 comprising an external cylindrical surface 82a extending inside the surface 80a, and internal oil pipes 82b each opening onto the surface 82a.

As can be seen in FIG. 3, which illustrates a step in the assembly of the device 74, the device 74 is in the form of a pre-assembled cartridge. The shaft 82 of the device 74 is first attached to the planet carrier 48d of the reducer 48 by means of a nut 83, then the device in the form of a cartridge which is secured to the reducer 48 is brought closer to the rest of the turbine engine so that its annulus 80 is attached to the casing 42 by means of the downstream portion 50b of the stator 50.

This technology has a number of problems, as described above.

The present disclosure allows to remedy some or all of these problems by means of an oil transfer device, an embodiment of which is illustrated in FIGS. 5 to 11.

The reference numbers used in the foregoing to designate certain elements are used in the following description and in FIGS. 5 to 11 insofar as they designate these same elements.

The oil transfer device 174 of FIGS. 5 to 11 also comprises a stator annulus 180 and a shaft 182 engaged in the stator annulus 180 and movable in rotation about the axis A inside this annulus 180.

The device 174 also comprises an annular support 250.

The annulus 180 comprises an internal cylindrical surface 180a and internal oil pipes 180b each opening onto the surface 180a. The pipes 180b are arranged one behind the other along the axis A. There are three of them in the example shown. Although the pipes 180b are shown here in a same axial plane, they could be located in different axial planes. This depends in particular on the conduits 192 to which they are connected and the arms 42b through which these conduits pass. In yet another variant, the pipes 180b could comprise radially external ends located in a same axial plane and ends distributed angularly around the axis A and opening onto the surface 180a.

Each of the pipes 180b comprises a radially internal end which forms the aforementioned opening and a radially external end which forms a port 190 for connecting to an oil conduit 192 or to a connection socket, as will be described in more detail below in relation to FIGS. 9 to 11.

Figure 6:
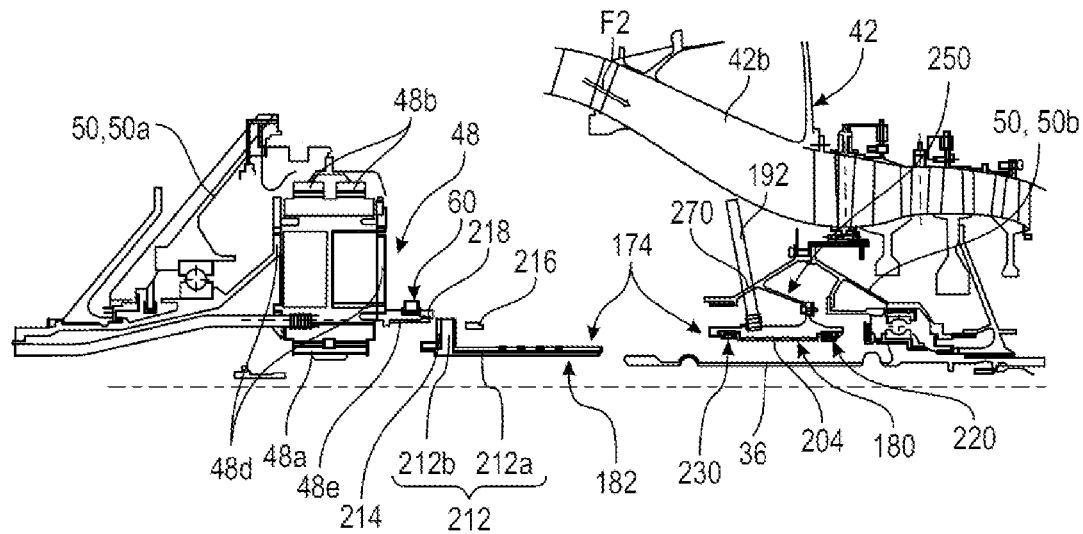
FIG. 6 is a schematic half-view in axial cross-section of a turbine engine equipped with the device shown in FIG. 5, and illustrates a step in the assembly of this device.
Figure 7:
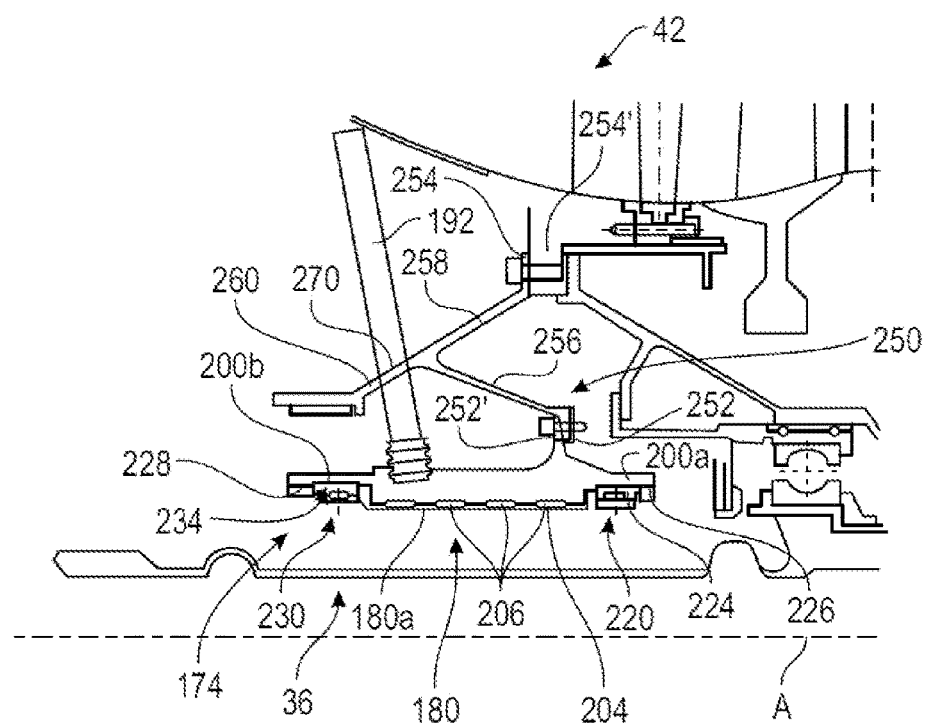
FIG. 7 is a larger scale view of a first detail of FIG. 6.
Figure 8:
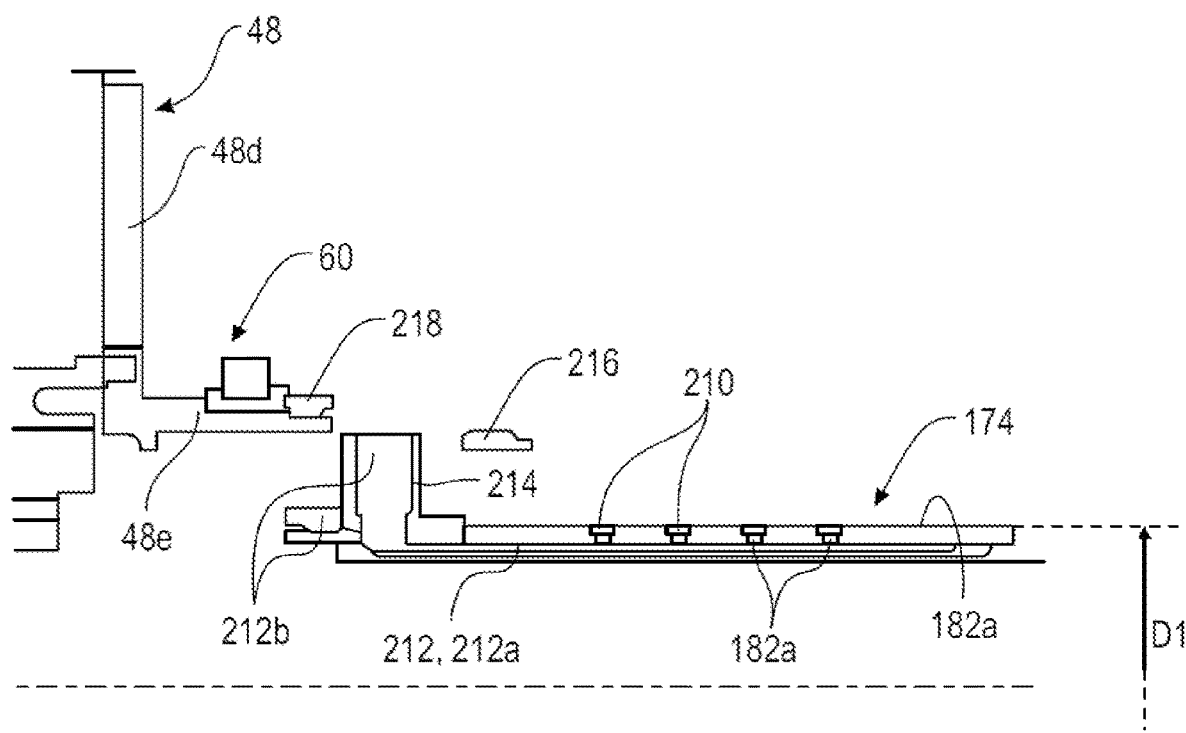
FIG. 8 is a larger-scale view of a second detail from FIG. 6.

The port 190 forms a female portion and an end of the conduit 192 or of the socket forms a male portion engaged in a sealing manner in the port 190. One of the conduits 192 connected to the annulus 180 is shown in FIGS. 6 and 7. These conduits 192 extend radially, firstly through openings 270 in the support 250, and secondly through tubular arms 42b of the inlet casing 42 which are located in the flow duct of the primary flow F2. These conduits 192 then pass through the guide vanes 42a, which are located in the flow duct of the secondary flow F3, to reach the lubrication system located in the nacelle (see FIG. 1). Alternatively, the lubrication system can be mounted in the engine (between the primary duct-compressors 14 and 16) and the casing 70 of the secondary duct, so that these conduits 192 do not pass through the secondary flow F3.

The annulus 180 is generally cylindrical in shape and comprises an upstream cylindrical rim 200a and a downstream cylindrical rim 200b. These rims 200a, 200b have identical or similar diameters.

A shrink ring 204 is attached inside the annulus 180 so as to cover its surface 180a. This shrink ring 204 extends over a major portion of the length of the annulus 180 and comprises a radially external annular rim 204a at its upstream end which bears axially against a cylindrical bearing surface of the annulus 180. As its name suggests, the shrink ring 204 is shrink-fitted into the annulus 180. The shrink fitting associated with the support of its rim 204a ensures that the shrink ring 204 is immobilised with respect to the annulus 180.

The shrink ring 204 comprises an annular row of radial orifices 206 in line with each of the pipes 180b. In addition, an annular groove 208 is formed at the internal periphery of the annulus 180 and in line with each of the pipes 180b, this groove 208 being closed on the inside by the shrink ring 204. It is therefore understood that each pipe 180b supply a groove 208 and that each groove 208 distributes oil to the orifices 206 of the shrink ring 204.

The shrink ring 204 comprises an external cylindrical shrink-fit surface which is in contact with the internal surface 180a of the annulus 180, and an internal cylindrical centring surface intended to be separated by a predetermined radial distance from the external surface 182a of the shaft 182 to define a plain bearing P.

The shaft 182 has no shrink ring. This allows to reduce the number of tolerance stacking interfaces. As a result, the clearances between rotor and stator are greatly reduced by reducing the number of interfaces.

The shaft 182 comprises an external cylindrical surface 182a extending inside the surface 180a and internal oil pipes 182b each opening onto the surface 182a. The pipes 182b all have a radial orientation and are arranged one behind the other along the axis A. There are three of them in the example shown.

An annular groove 210 is formed at the external periphery of the shaft 182 and in line with each of the pipes 182b.

Each of the pipes 182b is connected to a conduit 212 which can be integrated into the shaft 182. One of these conduits 212, visible in section in the figures, comprises an annular segment 212a which extends around the axis A and along a major portion of the length of the shaft 182. The downstream end of this segment 212a is connected to the downstream-most pipe 182b of the shaft, and its upstream end is connected to a radial segment 212b which is formed in an upstream annular rib 214 of the shaft.

This rib 214 is used for the attachment of the shaft 182 of the device 174. In the example shown, the shaft 182 of the device 174 is attached to the planet carrier 48d of the reducer 48. The planet carrier 48d comprises a downstream cylindrical rim 48e, on the external periphery of which the bearing 60 is mounted, and on the internal periphery of which the rib 214 engages. This rib 214 rests axially upstream on a cylindrical bearing surface of the rim 48e and is held in axial abutment against this bearing surface by a nut 216 screwed from downstream onto the internal periphery of the rim 48e.

The bearing 60 is a rolling bearing and comprises rollers which are arranged between two rings, an internal ring and an external ring respectively, the internal ring being clamped axially against another cylindrical bearing surface on the external periphery of the rim 48e by a nut 218 screwed onto this periphery from downstream.

A first rolling bearing 220 is mounted between the rim 200b of the annulus 180 and the downstream end of the shaft 182.

The bearing 220 is a rolling bearing and comprises rollers arranged between two raceways, an internal raceway and an external raceway respectively.

The internal raceway of the bearing 220 is integrated into the shaft 182, i.e. there is no internal ring fitted on the shaft 182 for the bearing 220.

The external raceway of the bearing 220 is formed by an external ring 224 mounted inside the rim 200b. This ring 224 rests axially on a cylindrical bearing surface on the internal periphery of the upstream rim 200b. Downstream, the ring 224 is held axially by a nut 226 screwed to the internal periphery of the rim 200b or a shrink ring engaged in this rim.

The internal raceway of the bearing 230 is integrated into the shaft 182, i.e. there is no internal ring fitted to the shaft 182 for the bearing 230.

The external raceway of the bearing 230 is formed by an external ring 234 mounted inside the rim 200a. This ring 234 rests axially on a cylindrical bearing surface on the internal periphery of the downstream rim 200a. Upstream, the ring 234 is held axially by a nut 228 screwed to the internal periphery of the rim 200a or a shrink ring engaged in this rim.

Figure 5:
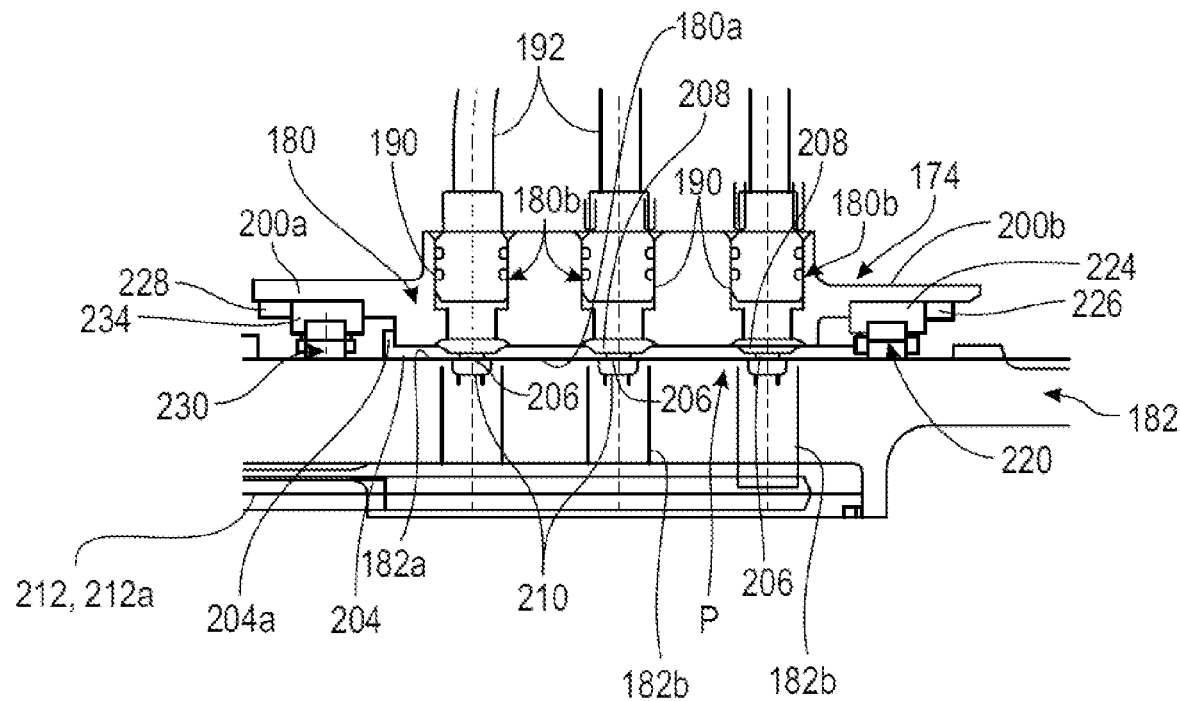
FIG. 5 is a schematic half-view in axial cross-section of an oil transfer device according to the disclosure.

Advantageously, as can be seen in FIG. 5, the external surface 182a of the shaft 182 and the internal raceways of the bearings 220, 230 (integrated to the shaft 182) have the same diameter D1 and extend continuously in the extension with each other. It is thus understood that the shaft 182 can be mounted inside the annulus 180 by axial translation, the annulus 180 being able to be pre-equipped with the shrink ring 204 and the rings 224, 234 and the rollers of the bearings 220, 230 just before this translation.

The plain bearing P is supplied with oil directly via the pipes 180b of the annulus 180. It is understood that the radial thickness of the space between the shrink ring 204 and the surface 182b is calculated so that controlled leakage takes place at the interfaces between the pipes 180b, 182b, so as to supply the plain bearing P. The oil then spreads over the entire axial extent of the plain bearing P and as far as the rolling bearings 220, 230 in order to lubricate them.

By "way" of the device 174 is meant the association of a pipe 180b of the annulus 180 with a pipe 182b of the shaft 182. In the example shown, the device 174 comprises three ways. Preferably, one of the ways is used for the oil supply to the actuator 62, and another of the ways is used for the oil return from the actuator 62. Finally, the last way can be used for the hydraulic protection of the actuator or to supply oil to the reducer 48.

The device 174 is configured, for example, to supply the actuator 62 with an oil pressure of between 2 and 200 bar, and preferably between 5 and 130 bar.

The annular support 250 extends at least partly around the annulus 180 and comprises at least one first attachment member for attaching to the annulus 180 and at least one second attachment member for attaching to the casing 42. In the example shown, these members are formed by annular flanges 252, 254 which are intended to be attached to corresponding annular flanges by screw-nut type means.

The support 250 is configured to deform elastically so as to allow the annulus 180 to move in a radial direction.

Figure 9:
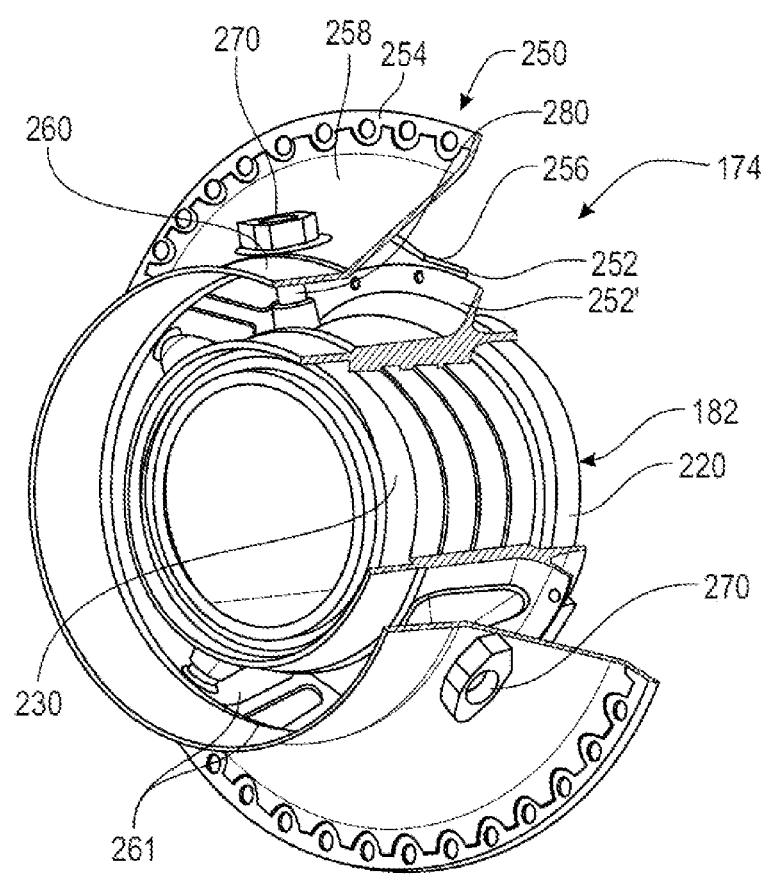
FIG. 9 is a partial schematic perspective view of the device shown in FIG. 5.
Figure 10:
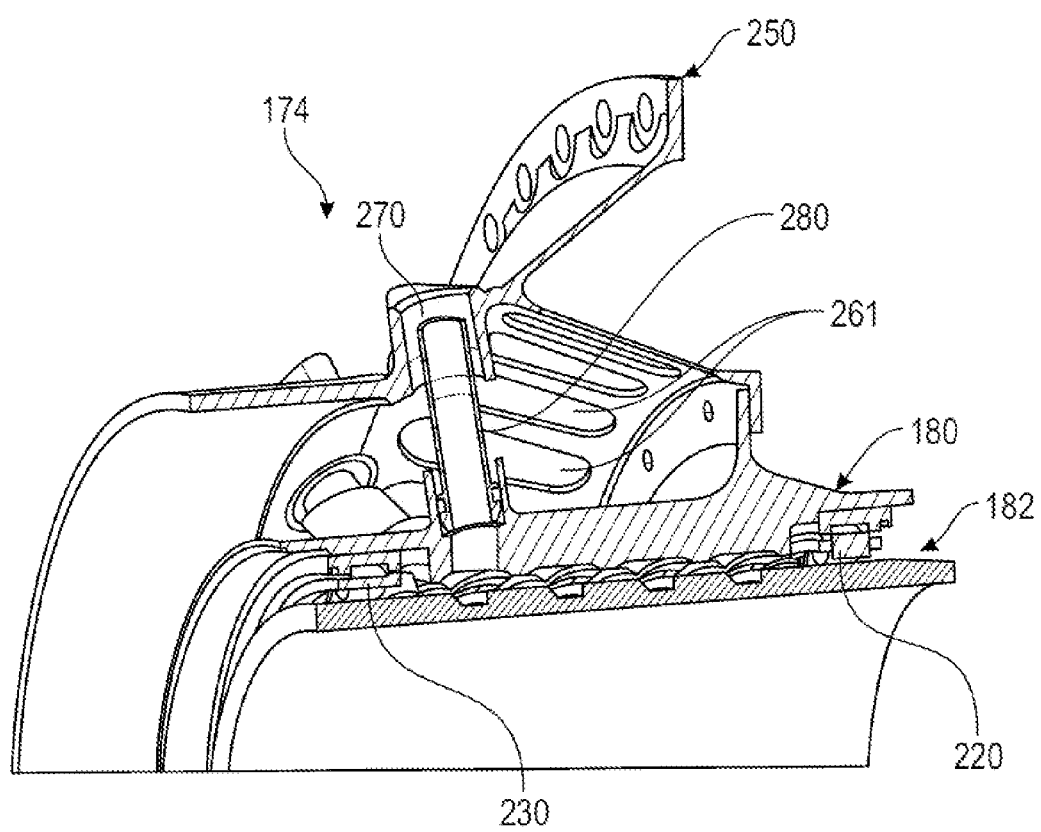
FIG. 10 is another partial schematic perspective view of the device shown in FIG. 5.
Figure 11:
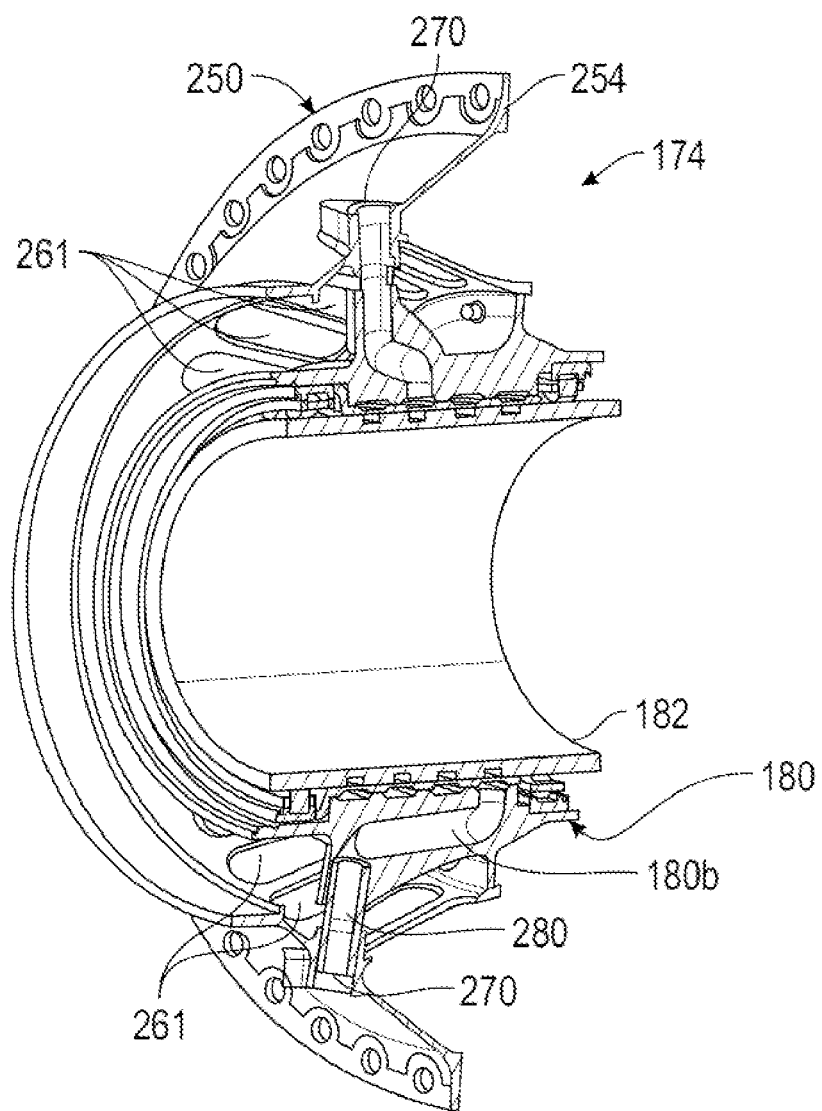
FIG. 11 is another partial schematic perspective view of the device shown in FIG. 5.

In the example shown, the support 250 comprises frustoconical walls 256, 258, 260, at least one of which is perforated, i.e. comprises apertures 261 passing through it, so as to reduce its rigidity in the radial direction (FIGS. 9 to 11). This rigidity can also be reduced by reducing the thickness of this wall.

The support 250 comprises a first frustoconical wall 256 which extends radially inwards from upstream to downstream and which is connected at its internal periphery to the attachment flange 252 for attaching to a flange 252' of the annulus 180. In the example shown, the flange 252' of the annulus extends in a plane perpendicular to the axis A, which passes between the bearings 220, 230 of the device 174.

The support 250 comprises a second frustoconical wall 258 which extends radially outwards from upstream to downstream from the external periphery of the first wall 256. This second wall 258 comprises at its external periphery the attachment flange 254 for attaching to a flange 254' of the casing 42 (FIG. 7). The flange 254' extends in a plane perpendicular to the axis A, which is close to the plane passing through the flange 252'.

This means that the walls 256, 258 form a V in axial section, with the tip pointing upstream.

The support 250 comprises a third frustoconical wall 260 which extends radially outwards from upstream to downstream and whose external periphery is connected to the junction area of the walls 256, 258. The internal periphery of this wall 260 is therefore located on the upstream side and carries the external ring of the aforementioned bearing 60 in the example shown.

As mentioned above, the support 250 comprises openings 270 for the passage of the conduits 192 supplying oil to the pipes 180b of the annulus 180.

In the example shown, these openings 270 are formed in the frustoconical wall 260 and are best seen in FIGS. 9 to 11. Advantageously, the wall 260 comprises as many openings 270 as there are internal pipes 180*b* in the annulus 180, i.e. three for example. These openings 270 are distributed around the axis A and are radially aligned with one of the aforementioned ports 190 of the annulus.

Sealed fluidic connection socket 280 can extend into the annular space located between the annulus 180 and the support 250 and each comprise a radially external end engaged in one of the openings 270, and a radially internal end engaged in one of the ports 190. The aforementioned conduits 192 would then comprise radially internal ends engaged in a sealing manner in the openings 270 to be connected by the socket 280 to the pipes 180*b* of the annulus 180.

FIGS. 9 to 11 show that the sockets 280 are straight and that it is the pipes 180*b* of the annulus which are shaped, and in particular more or less bent, to connect these sockets 280 to the grooves 208 and to the orifices 206.

The most upstream pipe 180*b* of the annulus 180, for example, visible in cross-section in FIG. 10, has a straight or rectilinear orientation and is substantially aligned with the corresponding socket 280 and opening 270.

The most downstream pipe 180*b* of the annulus 180, for example, visible in the lower portion of the cross-sectional view in FIG. 11, has two bends connected by an elongated portion which extends substantially parallel to the axis A.

Finally, the intermediate pipe 180*b* of the annulus, visible in the top portion of the cross-sectional view in FIG. 11, is generally S-shaped.

It can be seen that the openings 270 are located substantially in the same plane perpendicular to the axis A.

FIG. 6 shows a method for assembling the device 174. A first step consists of attaching the annulus 180 to the support 250 by attaching the flanges 252, 252' together, then connecting the conduits 192 to the pipes 180*b* or to the openings 270 in the support 250, as described above.

Another step consists of engaging the shaft 182 in the planet carrier 48*d* of the reducer 48 and attaching it to the latter by tightening the nut 216.

The shaft 182 is then engaged in the annulus 180 by axial translation of the assembly formed by the reducer 48 and the shaft 182 in the annulus 180.

FIG. 6 shows that the shaft 182 is interposed between the LP shaft 36, the upstream end of which is coupled to the sun gear 48*a* of the reducer, and the annulus 180, and that the external ring carried by the support 250 covers the rollers of the bearing 60 located with the internal ring of this bearing on the rim 48*e* of the planet carrier 48*d*. The upstream portion 50*a* of the stator is then attached to the casing 42, which allows the shaft 182 to be positioned precisely inside the annulus 180 in the axial direction.

The invention claimed is:

1. A fan module for an aircraft turbine engine, the fan module comprising a fan comprising a fan shaft and variable pitch fan vanes, and an oil transfer device configured to ensure a transfer of oil between a stator and an actuator that is secured in rotation to the fan shaft and that is configured to control the pitch of the fan vanes, the oil transfer device comprising:
   a stator annulus comprising an internal cylindrical surface and internal oil pipes each opening onto said internal cylindrical surface,
   a shaft engaged in said annulus and comprising an external cylindrical surface extending inside said internal cylindrical surface, the shaft comprising internal oil pipes each opening onto said external cylindrical surface, the shaft further comprising an attachment member configured to be attached to a rotor of the turbine engine,
   an annular support which extends at least partly around the annulus and which comprises at least one first attachment element configured to attach to the annulus and at least one second attachment element configured to be attached to a stator of the turbine engine,
   a plain bearing (P) located between said internal and external cylindrical surfaces, and
   upstream and downstream roller bearings mounted between the annulus and the shaft, on either side of the plain bearing (P), each of the upstream and downstream roller bearings comprising external rings and rollers carried by the annulus, the annulus being configured to be mounted on the shaft by engagement of the shaft in the annulus when the latter is pre-equipped with the external rings and with the rollers of the bearings,
   wherein said support is configured to deform elastically so as to allow the annulus to displace in the radial direction.

2. The fan module according to claim 1, wherein the support comprises a first frustoconical wall which is perforated.

3. The fan module according to claim 2, wherein the first frustoconical wall has an internal end which is directly connected to or directly carries said at least one first attachment element, the first frustoconical wall extending radially inwardly from an upstream end of the first frustoconical wall to a downstream end of the first frustoconical wall.

4. The fan module according to claim 3, wherein the support comprises a second frustoconical wall, the internal end of which is directly connected to an external end of the first frustoconical wall and the external end of which is directly connected to or directly carries said at least one second attachment element, the second frustoconical wall extending radially outwards from an upstream end of the second frustoconical wall to a downstream end of the second frustoconical wall.

5. The fan module according to claim 4, wherein the first frustoconical wall has the external end which is directly connected to the external end of a third frustoconical wall, an internal end of which is connected to or carries an external ring of another roller bearing, the third frustoconical wall extending radially outwards from an upstream end of the third frustoconical wall to a downstream end of the third frustoconical wall.

6. The fan module according to claim 2, wherein the first frustoconical wall comprises an annular row of perforations, the perforations being distributed regularly around the first frustoconical wall.

7. The fan module according to claim 1, wherein the support comprises openings configured for the passage or the connection of conduits supplying oil to the pipes of the annulus.

8. The fan module according to claim 1, wherein a shrink ring is mounted inside the annulus and defines said plain bearing (P) with said external surface of the shaft.

9. The fan module according to claim 8, wherein the shaft comprises integrated internal raceways for rolling said rollers, and
   the internal raceways are formed by a single cylindrical surface which extends continuously inside the shrink ring.

10. The fan module according to claim 1, wherein the shaft comprises integrated internal raceways for rolling said rollers.

11. The fan module according to claim 1, wherein the fan is driven in rotation by a reducer, said oil transfer device being mounted downstream of the reducer and being configured to supply oil to the reducer and to the actuator via conduits passing axially through the reducer.

12. The fan module according to claim 11, wherein the shaft of the oil transfer device is attached to the planet carrier of the reducer.

13. The fan module according to claim 12, wherein a rolling bearing is mounted between the planet carrier and said support.

14. A method for assembling a fan module according to claim 12, the method comprising the steps of:
attaching the shaft to the planet carrier of the reducer, and attaching the annulus to the stator by means of said support, and then
engaging the shaft in the annulus.

15. The fan module according to claim 11, wherein the conduits pass axially through a planet carrier of the reducer.

16. The fan module according to claim 1, wherein said at least one second attachment element of the annular support is located at an external end of the annular support, said at least one second attachment element of the annular support being attached to an internal wall of an annular air intake passage.

17. The fan module according to claim 1, wherein said at least one second attachment element of the annular support is located at an external end of the annular support, said at least one second attachment element of the annular support being flanged to an internal flange of an internal wall of an annular air intake passage.

18. The fan module according to claim 1, wherein rollers of each of the upstream and downstream roller bearings are directly in contact with the external cylindrical surface of the shaft.

19. The fan module according to claim 1, wherein the external ring of each of the upstream and downstream roller bearings is directly housed in an internal housing of the annulus.

20. The fan module according to claim 1, wherein the internal oil pipes of the annulus are angularly offset from each other.

21. The fan module according to claim 1, wherein said at least one first attachment element of the annular support is closer to the downstream roller bearing than to the upstream roller bearing.

* * * * *